(12) United States Patent
Corben et al.

(10) Patent No.: US 9,376,335 B2
(45) Date of Patent: Jun. 28, 2016

(54) PROCESS TO TREAT INDUSTRIAL WASTEWATER

(75) Inventors: Tim Corben, Vijfhuizen (NL); Wolfram Franke, Porsgrunn (NO); Marina Ettl, Alpen-Veen (DE); Jan Hilmers, Berlin (DE)

(73) Assignee: YARA INTERNATIONAL ASA, Oslo (NO)

( * ) Notice: Subject to any disclaimer, the term of this patent is extended or adjusted under 35 U.S.C. 154(b) by 163 days.

(21) Appl. No.: 14/009,888

(22) PCT Filed: Mar. 26, 2012

(86) PCT No.: PCT/EP2012/055336
§ 371 (c)(1),
(2), (4) Date: Oct. 4, 2013

(87) PCT Pub. No.: WO2012/136505
PCT Pub. Date: Oct. 11, 2012

(65) Prior Publication Data
US 2014/0027377 A1    Jan. 30, 2014

(30) Foreign Application Priority Data
Apr. 6, 2011  (NO) .................................. 20110527

(51) Int. Cl.
*C02F 3/28* (2006.01)
*C02F 1/72* (2006.01)
(Continued)

(52) U.S. Cl.
CPC ................. *C02F 3/286* (2013.01); *C02F 1/722* (2013.01); *C02F 3/006* (2013.01); *C02F 3/28* (2013.01); *C02F 2103/322* (2013.01);
(Continued)

(58) Field of Classification Search
CPC .......... C02F 3/286; C02F 1/722; C02F 3/066; C02F 3/28; C02F 2103/322; C02F 2103/325; C02F 2209/005; C02F 2209/02; C02F 2209/04; C02F 2209/265; C02F 2209/40; C02F 2307/08; Y02E 50/343; Y02W 10/12
USPC .................. 210/605, 614, 631, 143, 252, 259
See application file for complete search history.

(56) References Cited

U.S. PATENT DOCUMENTS

| 4,049,545 A | 9/1977 | Horvath |
| 5,053,142 A * | 10/1991 | Sorensen et al. .............. 210/742 |
| 5,200,092 A | 4/1993 | Richards et al. |
| 7,799,224 B2 * | 9/2010 | Matheis .................. C02F 3/006 210/610 |
| 2004/0173525 A1 * | 9/2004 | Hunniford .............. C02F 1/008 210/610 |
| 2006/0196828 A1 | 9/2006 | Brown et al. |

(Continued)

FOREIGN PATENT DOCUMENTS

| GB | 2 025 922 | 1/1980 |
| JP | 58-092498 | 6/1983 |

(Continued)

OTHER PUBLICATIONS

International Search Report issued Oct. 2, 2012 in International (PCT) Application No. PCT/EP2012/055336 along with the International Preliminary Report on Patentability dated Jul. 30, 2013.

*Primary Examiner* — Fred Prince
(74) *Attorney, Agent, or Firm* — Wenderoth, Lind & Ponack, L.L.P.

(57) ABSTRACT

The present invention concerns a process for treatment of industrial waste water containing both easy biodegradable and heavy biodegradable matter wherein the process comprises the two steps of first treating the waste water in a bioreactor wherein a nitrate solution is added and secondly treating the waste water in a chemical oxidation step wherein an oxidizer, permanganate, is added.

16 Claims, 7 Drawing Sheets

(51) Int. Cl.
  *C02F 3/00*   (2006.01)
  *C02F 103/32*  (2006.01)

(52) U.S. Cl.
  CPC .... *C02F 2103/325* (2013.01); *C02F 2209/005* (2013.01); *C02F 2209/02* (2013.01); *C02F 2209/04* (2013.01); *C02F 2209/265* (2013.01); *C02F 2209/285* (2013.01); *C02F 2209/40* (2013.01); *C02F 2307/08* (2013.01); *Y02E 50/343* (2013.01); *Y02W 10/12* (2015.05)

(56) References Cited

U.S. PATENT DOCUMENTS

2007/0034566 A1    2/2007    Brown et al.
2009/0188859 A1    7/2009    Matheis et al.

FOREIGN PATENT DOCUMENTS

| | | |
|---|---|---|
| JP | 10-015591 | 1/1998 |
| JP | 10-118695 | 5/1998 |
| WO | 03/031348 | 4/2003 |

* cited by examiner

ID OF INVENTION

The present invention concerns a two step process for treatment of industrial waste water containing organic matter. In the first step the waste water is treated in an anaerobe bioreactor and the second step is a chemical oxidation step.

BACKGROUND OF INVENTION

Industrial waste water, for instance from winery or olive oil production, contains a wide range of organic matter. Such waste water requires treatment according to Chemical Oxygen Demand (COD) level as well as treatment to prevent odour and $H_2S$ emissions. Although the availability of organic matter for biological processes is limited the concentration of organic compounds remains too high to use a pure chemical oxidizer system for pre-treatment efficiently.

State of the art for the treatment of this kind of waste water is the application of heavy oxidizers, like hydroxyl or hydrogen peroxide, in combination with a catalyst, for instance titanium dioxide. At the same time the chemical oxidizer spent is also used to oxidize matter that is easily biological degradable. Hence the chemical oxidizer is used inefficiently since parts of the oxidizer are used to oxidize biological degradable matter. On the other hand, treatment by pure biological steps is generally not able to have an effect on heavy degradable substances like oily or aromatic substances. Therefore a single kind of treatment—whether chemical or biological—remains inefficient or ineffective.

Additionally industrial processes often follow patterns on one hand and can change production on the other hand spontaneously. For that reason most systems run either on 100% treatment capacity or in manual mode. This kind of treatment may be successful most of the time, but also has unfortunate side effects. At peak emissions odour and $H_2S$ as well as COD in the waste water will not be treated sufficiently, and under low emission conditions unnecessary treatment with overdosed chemicals occur. This cause discomfort and contamination under peak emission and additional cost and emission of overdosed chemicals under low emission conditions.

Current standard comprises collection data like measurement results and process parameters and transfer of the data to central database systems which can present data to the user through a network like internet. Current standard may also comprise feedback dosage from a remote measurement probe to a dosing controller via radio modem. Current standard also provide manual control of treatment and results by the operator. Included in current standard is also the possibility to change treatment parameters manually in accordance with operators demand. It would be desirable to use treatment processes for industrial waste water that can handle easily degradable organic matter in a biological treatment step and biological hardly degradable matter in a chemical treatment step. The system as such should be adaptive using process parameters like conductivity and/or hydrogen sulphide ($H_2S$) to adjust the dosages not only according to pre-set parameters but also according to production patterns and dynamic demands. Additionally the interaction with the operator should be used to prepare the system for unexpected system changes. Monitoring and adjusting dosage control should be done using an interactive interface, to create a simple, user friendly operating process.

From prior art several methods for the treatment of industrial waste water are known.

JP 10-015591 discloses a process wherein the first step in the waste water treatment is ammonia stripping and a biological treatment wherein nitrogen is processed biologically followed by a coagulation sedimentation stage and finally a chemical oxidation step. In contrast to the present invention the process is focussing on BOD degradation and not the biological harder degradable matter (COD-BOD).

US 2006/0196828 and US 2007/0034566 concern methods for treatment of oxidant waste streams, wherein domestic waste water is mixed with the oxidant stream before treatment in a bioreactor. The processes disclosed mainly concerns an oxidizer unit in front of the biological treatment. This unfortunately leads to partly degraded matter, such as aromatic compounds e.g. benzene, that cannot be treated biologically either. Thus efficiency as well as the effectiveness in total might be reduced. The present invention uses the chemical oxidizer in a second treatment step concerned with non-biological degradable matter.

JP 58-92498 discloses a method wherein waste water containing ammonia and BOD components is mixed with recycled sludge and a nitrate solution and subjected to biological treatment. Today this is a commonly used process, called the denitrification step. In the present invention the nitrogen addition is used to stimulate anaerobic conditions in the first treatment step.

SUMMARY OF INVENTION

The present invention concerns a process for treatment of industrial waste water containing both easy biodegradable and heavy biodegradable matter wherein the process comprises the two steps of first treating the waste water in a bioreactor and secondly treating the waste water in a chemical oxidation step.

DETAILED DESCRIPTION OF THE INVENTION

The present invention provides a synergetic combination of biological and chemical processes for the treatment of wastewater. The biological treatment step will precondition the water before entering the chemical treatment step. As discussed above, a single treatment process is not capable of providing efficient and effective treatment of wastewater comprising both easy biodegradable matter and heavy biodegradable matter. Whereas the present suggested two steps treatment process will provide both efficient and effective treatment of wastewater of such composition. The system used in the treatment process described in the following is comprised of two reactors with a clarifier tank providing gravity separation in between. The clarifier tank is connected with the two reactors with pipelines.

In the first reactor the easy degradable matter, measured as Biochemical Oxygen Demand (BOD), is reduced. Preferably a floating bed bioreactor under anaerobic conditions is used, but other bioreactors known in the art may also be used. The process is monitored on Oxidation Reduction Potential (ORP) and pH value (pH) by using commonly available probes. The reactor is fed with a micro dosage of nitrate salt solution in order to increase the yield of the methane production. The nitrate solution could be calcium nitrate ($Ca(NO_3)_2$), sodium nitrate or ferric nitrate. Micro aeration and micro nitrate dosage are known improvements for organics removal, (organics measured as the chemical oxygen demand (COD)) in anaerobic digesters.

The biological treatment process produces sludge, and approximately 50% of degraded organic matter is converted into sludge. To prevent a mass transfer into the chemical treatment step, the wastewater has to be purified before entering the chemical treatment reactor. This may be done for example by use of a settling tank or within a filtration unit.

Entering the chemical treatment step, the wastewater is treated with an oxidizer to reduce the biologically heavy degradable matter. The oxidation treatment is preferably performed by application of sodium permanganate ($NaMnO_4$), but also sodium hypochlorite solution or hydrogen peroxide can be used. The oxidizer can be used with higher efficiency by pre-treatment in the biological and physical reaction stage, as insolubles as well as easy degradable matter are not available for the chemical oxidation.

Thus application of both treatment steps eliminates biological easily and heavy degradable organic compounds and additionally minimises the needed effort to reduce sulphide. This synergistic result could not be achieved by either treatment alone. It is known in the art to add an oxidizer ahead of a biological treatment process. This will partly oxidize organic matter, as the oxidation will not take place specifically for heavy degradable matter—what reduces efficiency of the oxidizer application. By performing a biological treatment and taking out surplus sludge only the non-biodegradable matter remains for the treatment with the chemical oxidizer. Therefore the order of treatment steps is important for the present process.

The effluent contamination is preferably monitored using a Spectral Absorption Probe (SAK) to register organic loads, but measuring conductivity or redox potential can be alternatives. The oxidizer dosage can be adjusted automatically according to the organic load via signal transfer, because a higher SAK measurement value indicates higher organic load—and thus adjusted oxidizer dosage. In order to prevent any hydrogen sulphide ($H_2S$) formation downstream, the system can also use the nitrate solution dosage to prevent further $H_2S$ formation, too.

An intelligent dosage control apparatus, being a controller with an integrated web based interface, is preferably used in the process. Within the controller all available input signals from probes are monitored and used within a case-specific equation to determine the best dosage of chemicals in both reactors. Generally the BOD is removed by nitrates addition and is monitored through $H_2S$ formation, i.e. $H_2S$ is to be limited and if $H_2S$ occurs the dosage is too low. It is also possible to monitor the Oxidation Reduction Potential (ORP) in order to ensure instance anoxic conditions for the micro biology. The remaining COD is treated by oxidizer addition in a following step. This can be monitored by an SAK response and thereby the dosage can be adjusted to keep the remaining COD level low.

The equation result is modified by a pre-defined but preferably auto adjusted profile to obtain best match for a stabilized system. In order to handle changes due to extraordinary situations, one or several factors—defined and adjusted by the operator—can be used to modify the dosage. All process parameters including the key parameters within the basic equation may be adjusted via the web interface. A web interface will allow process control from standard web-browsing clients readily available on personal computers, tablet PCs and smart phones.

Figure 1:
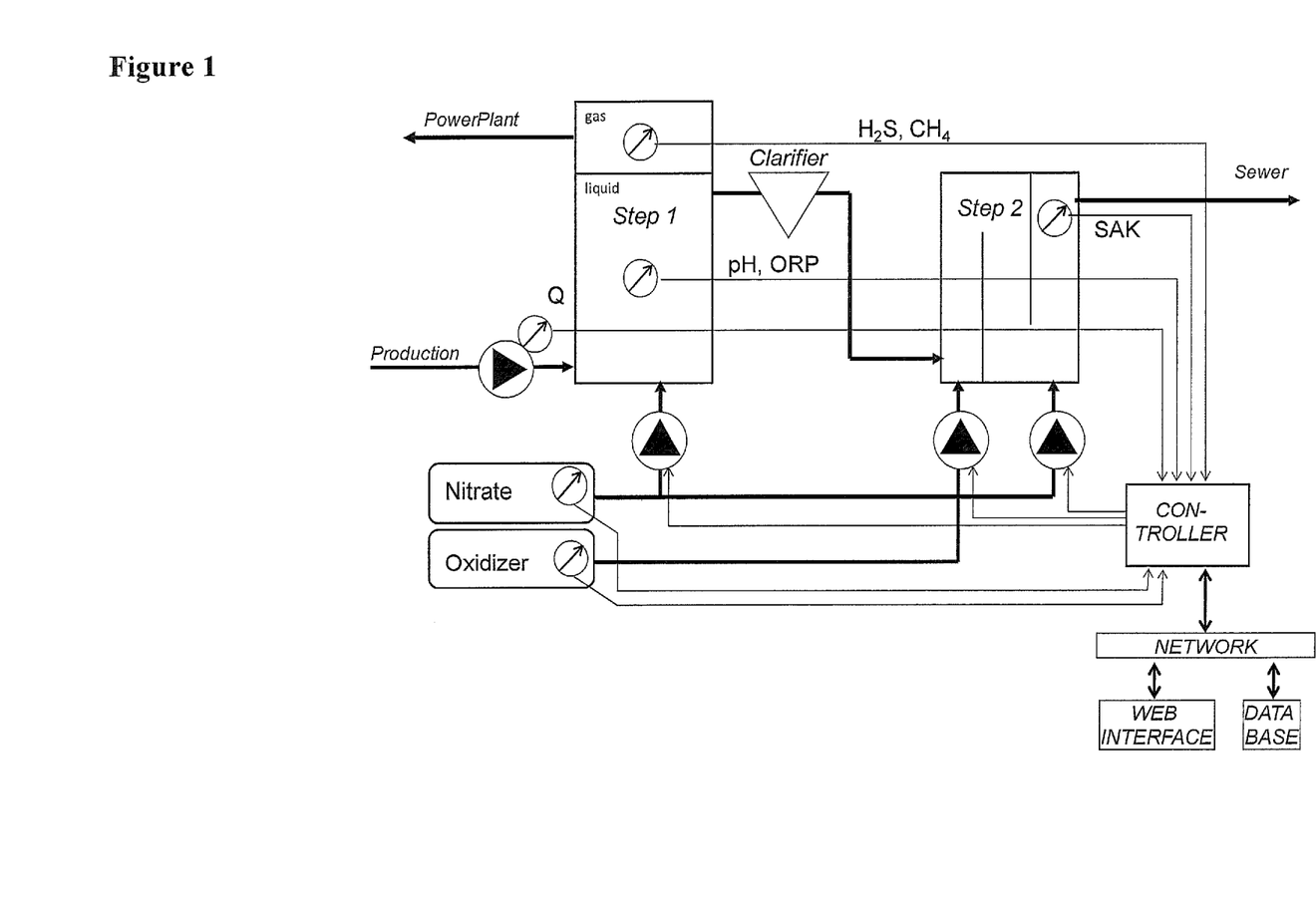
FIG. 1 shows a sketch of a treatment system including sensor probes and signal lines.

The present invention comprises the use of decentralized controlling units to control a multistep process in an efficient way. The present invention provides efficient and effective treatment process for industrial waste water. By use of the process according to the present invention a wide range of COD loads are reduced and additionally $H_2S$ loads and odour emissions are prevented. Additionally process monitoring and process controls are included and constitute part of the concept. These features add to the efficiency and effectiveness of the process treatment. A sketch of a treatment system including sensor probes and signal lines is given in FIG. 1.

Figure 2:
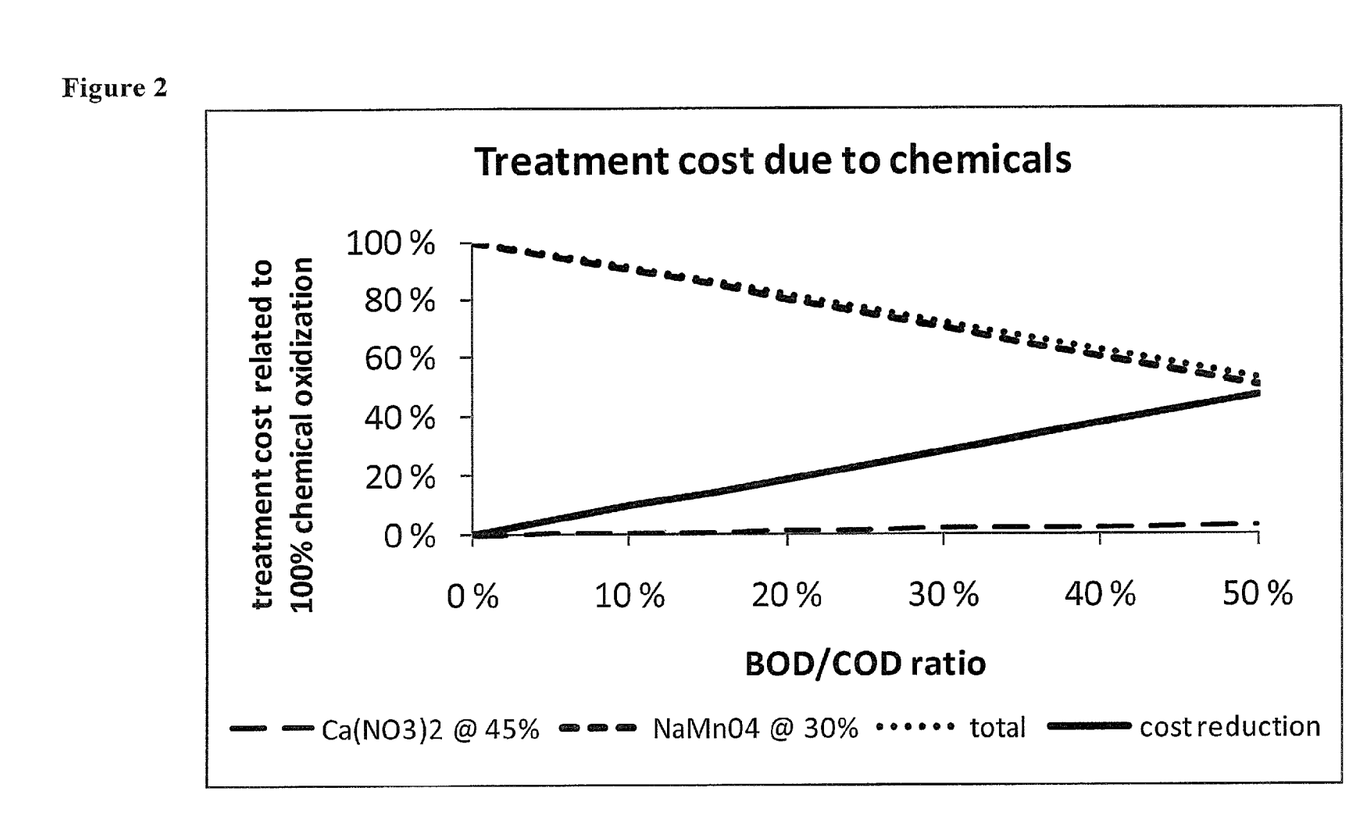
FIG. 2 indicates that especially for waste water with high content of biodegradable matter the cost can be reduced significantly. The cost cutting effect is only depending on the ratio between BOD and remaining COD. Therefore the costs are given with respect to a chemical oxidation only, as the 100% reference.

The following abbreviations are used:
Q flow
pH pH value
ORP oxygen reduction potential
SAK spectral absorption probe
$H_2S$ hydrogen sulphide
$CH_4$ methane The treatment costs depend strongly on the COD level. The cost cutting effect is only depending on the share between BOD and remaining COD, as the BOD can be treated with cheaper chemicals than the COD treatment afterwards. Therefore the costs are given with respect to chemical oxidation only as the 100% reference. The results are given in FIG. 2 and indicate that the cost can be significantly reduced, especially for waste water with high content of biodegradable matter.

The present invention relates to a process for treatment of industrial waste water containing both easy biodegradable and heavy biodegradable matter. The process comprises the two steps of first treating the waste water in a bioreactor and secondly treating the waste water in a chemical oxidation step.

According to the present invention a process for treatment of industrial waste water containing both easy biodegradable and heavy biodegradable matter comprises the two steps of first treating the waste water in an anaerobe bioreactor and secondly treating the waste water in a chemical oxidation step. A nitrate solution is added in an amount of between 0.4 kg/m$^3$ and 0.8 kg/m$^3$ in the biological treatment step and an oxidizer is added in the second step to reduce the amount of non-biological degradable compounds and said oxidizer is permanganate.

In this process the easy degradable matter is degraded in the first biological treatment step and the heavily biodegradable matter is oxidized in the second chemical treatment step.

In one embodiment of process a nitrate solution is added in the biological treatment step. Preferably the nitrate solution is a calcium nitrate solution with dry material content of 40% to 60%.

The amount of nitrate added is 0.1 L/m$^3$ to 1 L/m$^3$ and is adjusted stepwise until $H_2S$ concentration in the off-gas is below a pre defined level, for instance 5 ppm. The amount of nitrate added may also be expressed as typically being between 0.4 kg/m$^3$ and 0.8 kg/m$^3$, depending on bio degradable contents.

In the second treatment step of the process according to the invention an oxidizer is added to reduce the amount of non-biological degradable compounds.

In an embodiment of the invention the oxidizer is permanganate, preferably sodium permanganate, NaMnO$_4$.

The amount of permanganate added is typically 0.2 kg/m$^3$ to 0.8 kg/m$^3$. The permanganate is adjusted stepwise until SAK measured organics concentration in the effluent is below a pre defined level.

The process according to the invention may be controlled via integrated controlling system. The system has a number of analogue and digital inputs to connect all flow signals and probes. The system has a sufficient number of outputs to adjust the dosage pumps. The system has a data transfer connection to the internet, preferably bidirectional, in order to send data and receive commands from the internet platform. The system also contains the possibility to run programs containing the dosage algorithms. Accordingly, the process is controlled via integrated controlling system, wherein the system is capable of handling remote sensors and is programmable. Additionally the system is part of a network incorporating a database server and a web server to communicate with human operators.

In an embodiment of the invention signals of probes for pH value and for ORP value in the biological reactor is used to control and monitor the biological process and modify the dosage of nitrates solution accordingly. The measurement is made with standard probes. The pH value is monitored kept within neutral level. The ORP signal can be used to adjust the dosage of nitrates in the way that a value of −100 mV is always exceeded, if anoxic conditions are favoured.

The process according to the invention also provides an embodiment wherein signals of probes for H$_2$S and for CH$_4$ concentration in headspace or sewer atmosphere of the biological reactor is used to control and monitor the biological process and modify the dosage of nitrate solution. The measurement is made with standard probes. The parameters H$_2$S and CH$_4$ concentration are selected as biological H$_2$S formation is to be prevented and CH$_4$ production is supported. Accordingly, the CH$_4$ concentration is measured for monitoring reasons only. The H$_2$S signal is being used to adjust the dosage of nitrates in the way that a value of 5 ppm is never exceeded.

According to one embodiment of the invention a process is provided wherein signals of probes for organics (SAK) in the effluent of the second reactor are used to control and monitor the oxidation process and modify the dosage of oxidizer solution. The SAK monitors the organic load. As this shall be minimized the dosage must be increased stepwise until the SAK probe generated signal decrease below a pre defined value.

The higher the remaining organic load measured via SAK probe the more the dosage needs to be increased.

In an aspect of the invention a process is provided using customer set parameters and auto-adjusted parameters as well as pre-defined parameters to control the biological and the oxidation process in a synergetic way.

A network based control system may be used in this aspect of the invention. Further a comprehensive interface to present data and to adjust the dosage relevant parameters is used. In one embodiment of the invention a wireless network to establish the communication between the control units, the data base and the interactive interface is used. The network consists of computer systems owning static IP addresses within a wireless or landline network. The allocation of IP addresses is not part of the invention. The communication is for example performed via HTML protocol and HTML server software. The software running within each controller manages to process the script code, the HTML in- and output as well as data transfer. The controller units mostly calculate dosages, collect data from probes and transfer data to a database server. The web server presents data from the database. Additionally the web server sends data filled into the web user interface to the HTML servers on the controller systems by addressing the unique IP addresses.

The invention is illustrated by the following non-limiting examples.

EXAMPLES

Example 1

Figure 3:
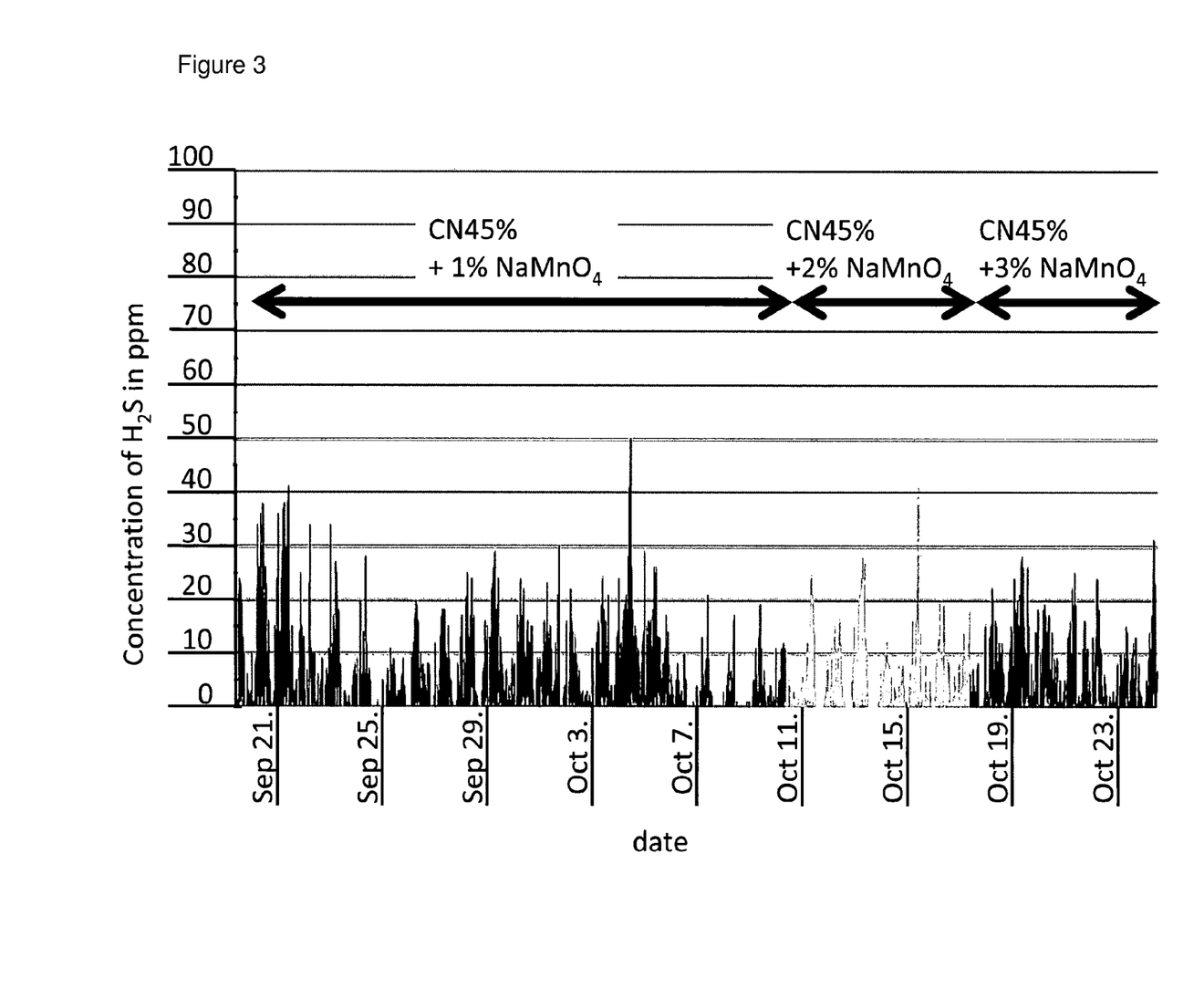
FIG. 3 shows results of a blended use of $Ca(NO_3)_2$ and $NaMnO_4$.

In a full scale test an existing dosing facility for Ca(NO$_3$)$_2$ dosage was upgraded with a dosage system for NaMnO$_4$. Combined dosage with up to 3% of Ca(NO$_3$)$_2$ dosage as NaMnO$_4$ was tested. The effect was neglectable. The simultaneous dosage of two oxidizing chemicals in one dosing spot is not helpful, as the strong oxidizer is not selective and will also be consumed by matter that should be oxidized by the weaker one to achieve higher efficiency of treatment. Thus a combined treatment is not recommended. Further increase of the NaMnO$_4$ dosage was no option with regards to economy, as the application costs were too high. Results of full scale application are shown in FIG. 3.

Example 2

In a two stage reactor system on lab scale synthetic waste water (basing on easy degradable matter) and ethylenediaminetetraacetic acid (EDTA; used as biological hardly degradable matter) were treated. The efficiency of the first treatment step was low. The efficiency increased slightly due to Ca(NO$_3$)$_2$ dosage. The EDTA was not reduced in the first treatment step and thus stayed as additional COD load and passed the second reactor. The major improvement was gained with NaMnO$_4$ treatment after the biological treatment. The NaMnO$_4$ was able to reduce also the EDTA load. Additionally it was shown that the Ca(NO$_3$)$_2$ dosage reduced the sulphide production without disturbing the anaerobic digestion in the first treatment stage. In a kind of compact setup as described here a network based system of controllers is not needed, but a sophisticated controller with probes for SAK and H$_2$S would have been beneficial.

Figure 4:
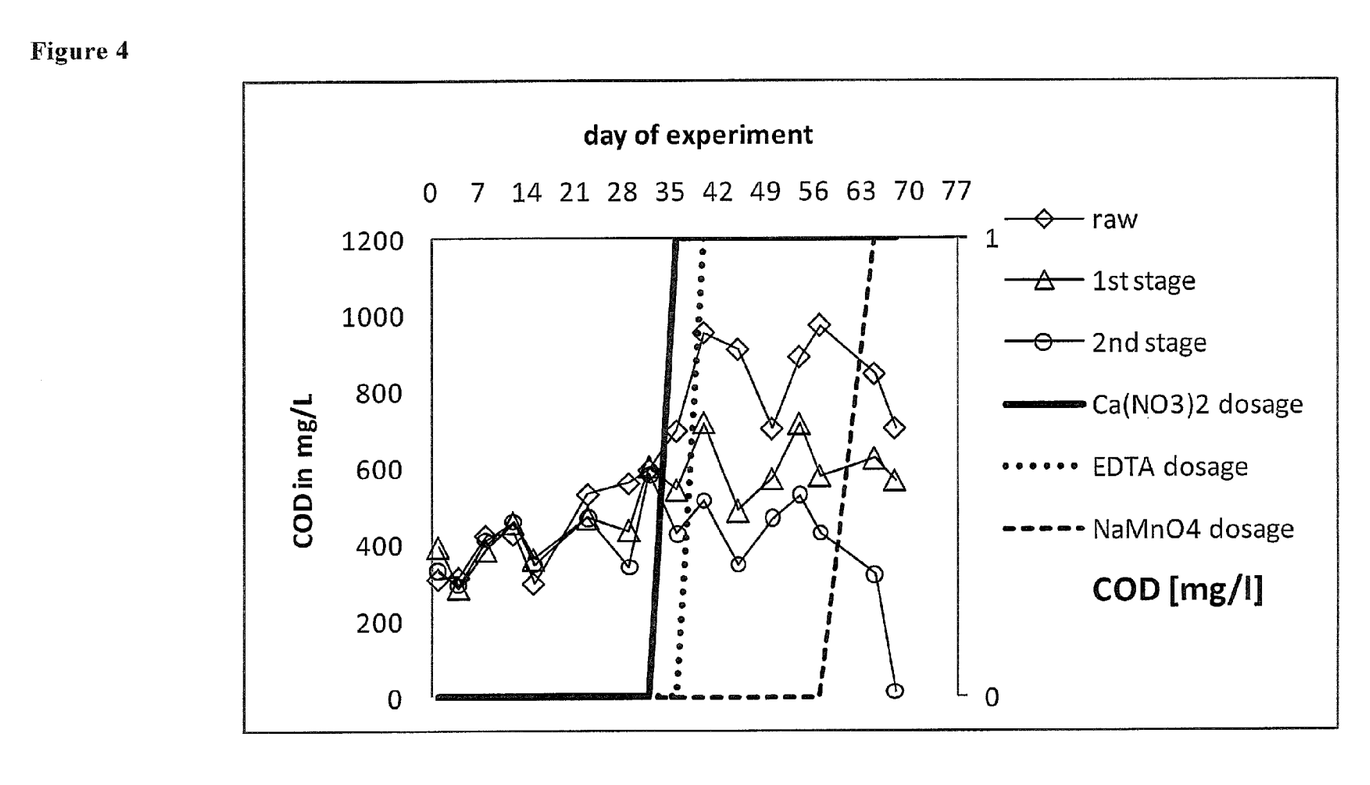
FIGS. 4 and 5 shows the results of the system according to the invention in a lab scale experiment as described in Example 2.
Figure 5:
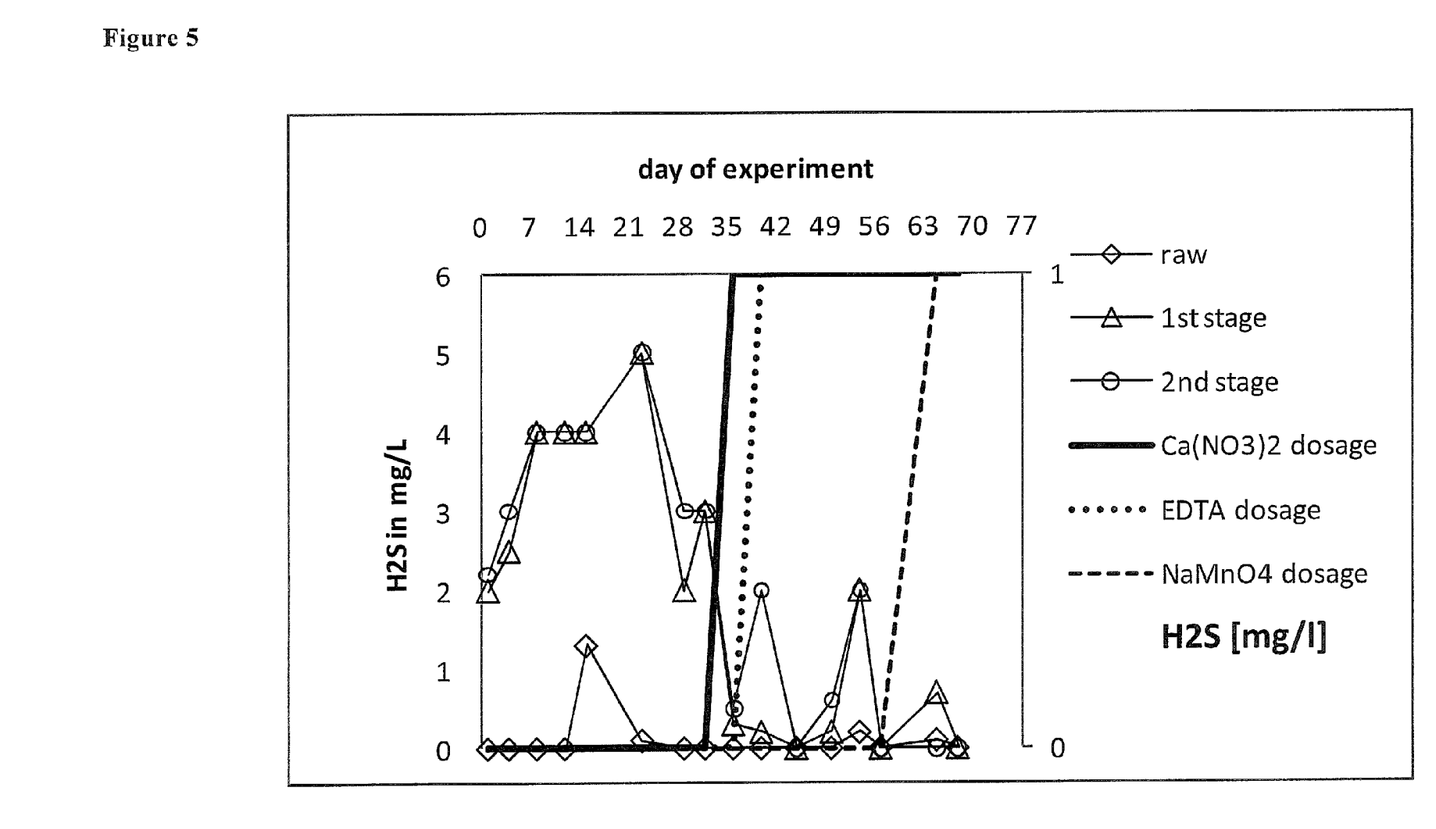

Results of the system are given in FIGS. 4 and 5.

Example 3

Figure 6:
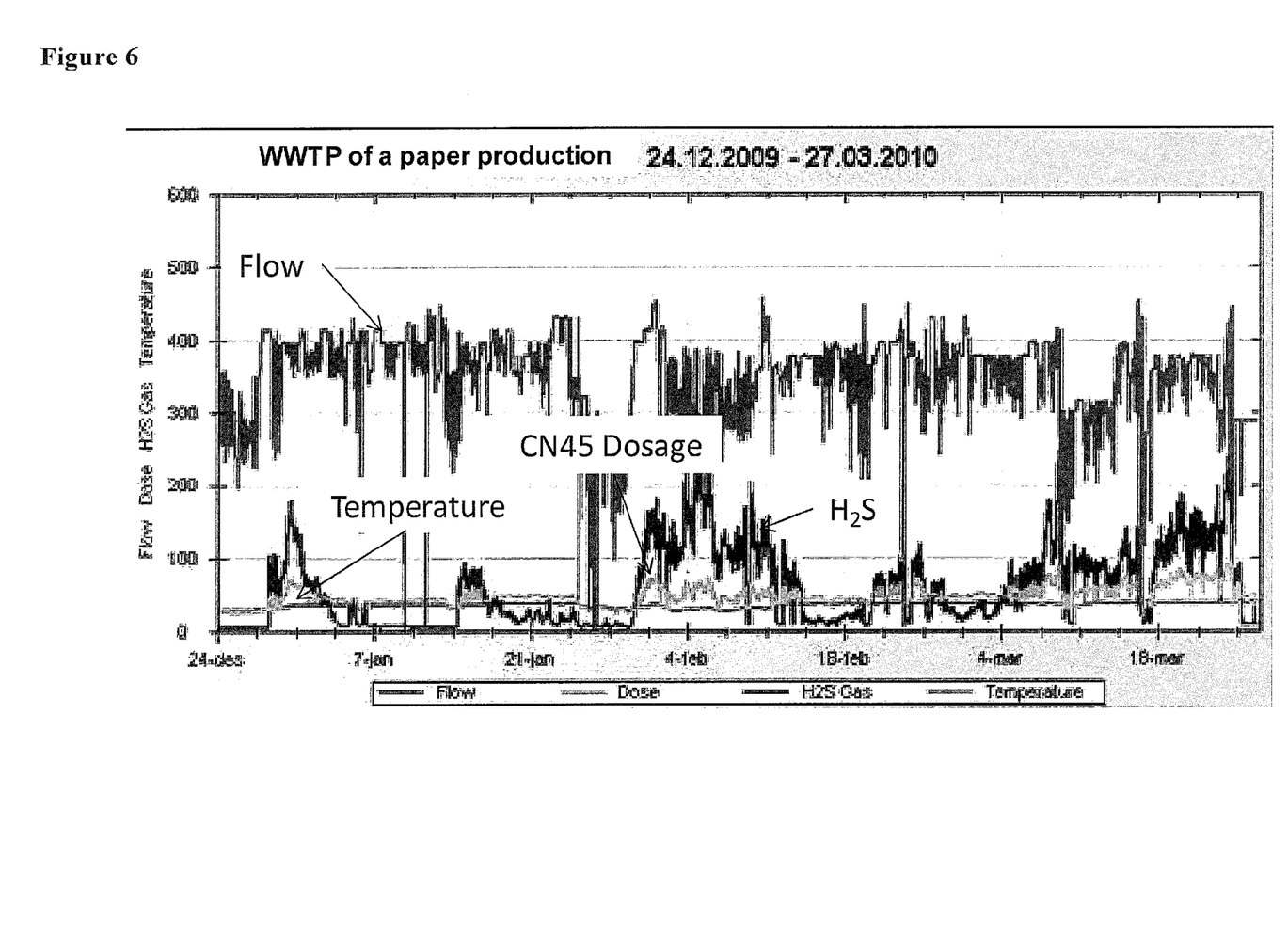
FIG. 6 shows the results of a $H_2S$ related feed-back dosage of $Ca(NO_3)_2$ solution

In full scale test installations the dosing system for Ca(NO$_3$)$_2$ application in wastewater for H$_2$S and odour prevention were equipped with a GPRS (General Packet Radio Service) linked dosing controller. The controller were linked to the flow signal from a waste water pumps, downstream mounted H$_2$S probes and temperature probes for dynamic dosage control. The system was connected to the internet via IP Address using a GPRS based mobile network. Via the system provider website the controller receives updated parameter values by the operator whenever an adaption is done. Additionally the websites were used to present stored data from a server and provide for them for download to have the possibility to monitor dosage and related parameters. These combined systems allow to run an efficient, effective and economical dosing strategy. Results of full scale application are shown in FIG. 6. Such a system for concentration control is for example described in WO 2007/046705 A1, Yara International ASA.

Example 4

In treatment plant for industrial produced sludge $H_2S$ occurred on high concentrations. A treatment with $Ca(NO_3)_2$ solution was not possible due to surrounding conditions. Therefore a treatment with $NaMnO_4$ solution was performed. The treatment was successful in terms of $H_2S$ reduction but very costly.

Example 5

In a full scale test installation a sewer system was treated. The sewer was used to transfer industrial wastewater including both easy and heavy degradable matter. The process was controlled and monitored with an internet based interface. The success of both chemical applications was monitored at the end of each section. In case of insufficient dosage it was adjusted automatically via feedback.

In the first sewer section a calcium nitrate solution was dosed to stimulate anaerobic digestion and to reduce $H_2S$ emissions. The dosage was calculated according to flow, temperature and expected biological processes in the sewer. The dosage was then adjusted according to feedback from the $H_2S$ measurement after the first section automatically. The dosage of nitrates was minimized in order to environmental aspects, as a wastewater treatment plant should not receive any load of nitrate.

In the second sewer section sodium permanganate solution was applied in order to reduce organic matter. Hereby it was beneficial to minimize the oxidizer dosage due to economical reasons (as described above). This was achieved by minimizing easy biodegradable organic matter as well as sulphide in the first section of application. This kind of in-sewer treatment was only possible regarding both economic and ecologic aspects using a wireless connection between all three positions of sewer network that are involved in the dosage concept, as the distance in between was several kilometers and a land line network was not available. Due to the interaction between both dosing stages synergy was achieved that would not be possible without the two stage treatment system as well as without the interaction via wireless network.

Figure 7:
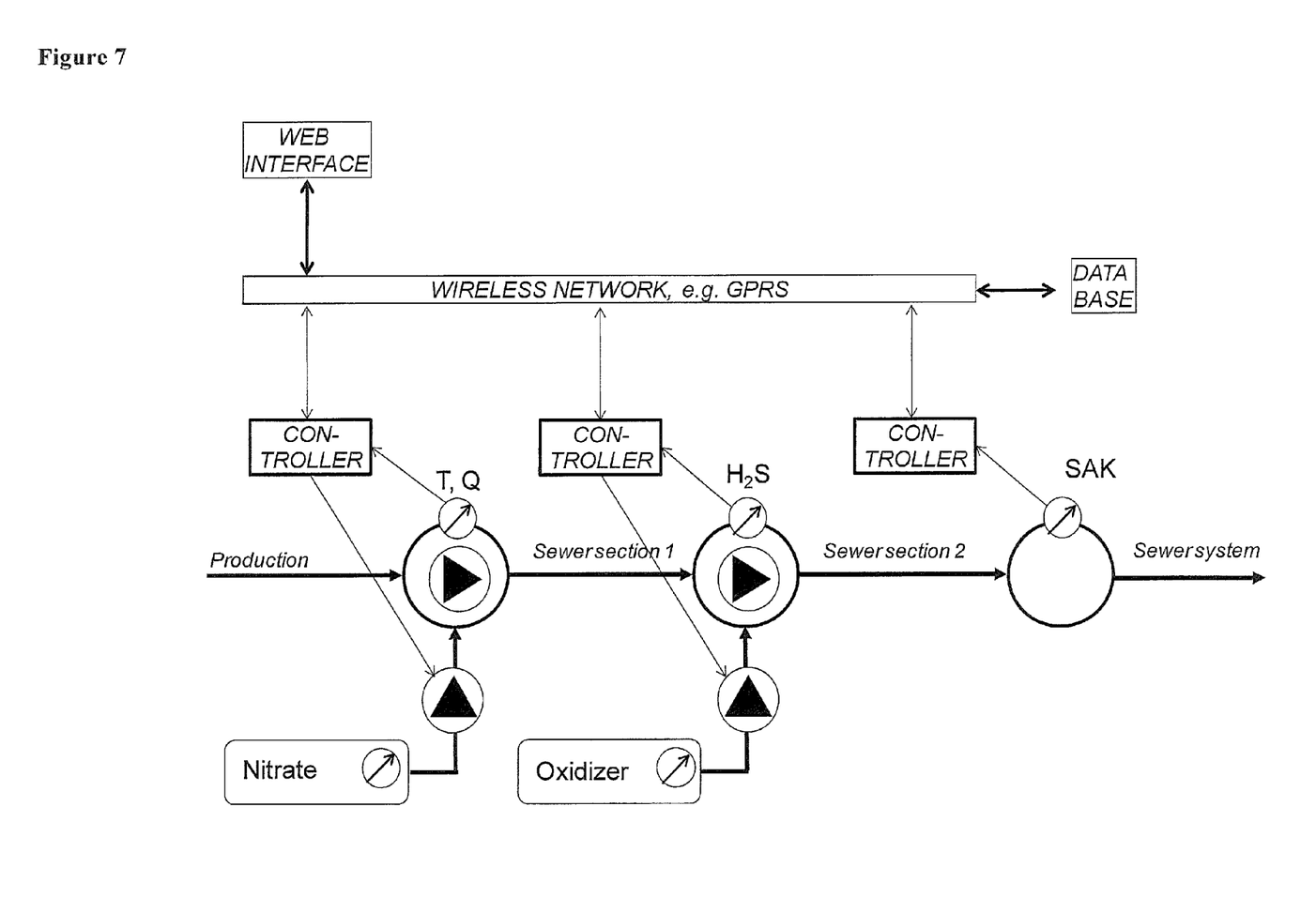
FIG. 7 shows a sketch of a system controlled and monitored with an internet based interface.

A sketch of the system is given in FIG. 7. The following abbreviations are used:
Q flow
T temperature
SAK spectral absorption probe
$H_2S$ hydrogen sulphide The flow signal was used to calculate the basic value for the dosage of nitrate and oxidizer solution. Those values are modified by temperature compensation terms. Additionally the $H_2S$ signal was used to adjust the nitrate dosage leaving minimum of $H_2S$ to prevent over dosage of chemicals. The dosage for the oxidizer was modified by the signal by the SAK probe. As all steps of the dosage system have a certain distance in between it turned out to be necessary to use data transfer via wireless network.

The invention claimed is:

1. A process for the treatment of industrial waste water comprising organic matters, the process comprising:
first conducting a biological treatment step by treating the waste water in an anaerobe bioreactor by adding a nitrate solution in an amount of between 0.4 kg/m$^3$ and 0.8 kg/m$^3$ to the waste water, and optionally, removing sludge formed in the biological treatment step,
wherein signals of probes for pH and oxygen reduction potential (ORP) in the anaerobe bioreactor are used to control and monitor the biological treatment step and modify the amount of the nitrate solution added to the waste water, and
second conducting a chemical oxidation step by treating the waste water in a second reactor by adding an amount of a permanganate oxidizer to the waste water to reduce an amount of non-biological degradable compounds in the waste water,
wherein signals of probes for organics in an effluent of the second reactor are used to control and monitor the chemical oxidation step and modify the amount of the permanganate oxidizer added to the waste water,
wherein the process is controlled via an integrated controlling system that is capable of handling remote sensors and is programmable, and wherein the system is part of a network, and incorporates a database server and a web server to communicate with a human.

2. The process according to claim 1, wherein the nitrate solution is a calcium nitrate solution with dry material contents of 40% to 60%.

3. The process according to claim 1, wherein the amount of the nitrate solutions depends on biodegradable contents.

4. The process according to claim 1, wherein the permanganate oxidizer is sodium permanganate.

5. The process according to claim 4, wherein the sodium permanganate is added in an amount of between 0.2 kg/m$^3$ to 0.8 kg/m$^3$, depending on oxidizable contents.

6. The process according to claim 1, further comprising signals of probes for $H_2S$ and for $CH_4$ concentration in a headspace or a sewer atmosphere of the anaerobe bioreactor used to control and monitor the biological treatment step and modify the amount of the nitrate solution in addition to the signals of the probes for the pH and ORP.

7. The process according to claim 1, further comprising the use of customer set parameter, auto-adjusted parameters, and pre-defined parameters to control the biological treatment step and the chemical oxidation step in a synergetic way.

8. The process according to claim 1, wherein the integrated control system is a network based control system.

9. The process according to claim 8, wherein the network based control system comprises a comprehensive interface to present data and to adjust the amounts of adding the nitrate solution and the permanganate oxidizer.

10. The process according to 8, wherein the network based control system comprises a wireless network to establish communication between control units, the data base server, and an interactive interfaced.

11. An integrated controlling system suitable for controlling the treatment of industrial waste water comprising organic matters,
wherein the treatment comprises a process of:
first conducting a biological treatment step by treating the waste water in an anaerobe bioreactor by adding a nitrate solution in an amount of between 0.4 kg/m$^3$ and 0.8 kg/m$^3$ to the waste water, and optionally, removing sludge formed in the biological treatment step,
wherein signals of probes for pH and oxygen reduction potential (ORP) in the anaerobe bioreactor are used to control and monitor the biological treatment step and modify the amount of the nitrate solution added to the waste water, and
second conducting a chemical oxidation step by treating the waste water in a second reactor by adding an amount of a permanganate oxidizer to the waste water to reduce an amount of non-biological degradable compounds in the waste water, wherein signals of probes for organics in an effluent of the second reactor are used to control and monitor the chemical oxidation step and modify the amount of the permanganate oxidizer added to the waste water, wherein the process is controlled via an integrated controlling system that is capable of handling remote sensors and is programmable, and wherein the system is part of a network and incorporates a database server and a web server to communicate with a human.

12. The integrated controlling system according to claim 11, further comprising signals of probes for $H_2S$ and for $CH_4$ concentration in a headspace or a sewer atmosphere of the anaerobe bioreactor used to control and monitor the biological treatment step and modify the amount of the nitrate solution in addition to the signals of probes for the pH and ORP.

13. The integrated controlling system according to claim 11, further comprising the use of customer set parameters, auto-adjusted parameters, and pre-defined parameters to control the biological treatment step and the oxidation step in a synergetic way.

14. Integrated The integrated controlling system according to claim 11, wherein the integrated control system is a network based control system.

15. The integrated controlling system according to claim 14, wherein the network based control system comprises a comprehensive interface to present data and to adjust the amounts of adding the nitrate solution and the permanganate oxidizer.

16. The integrated controlling system according to claim 14, wherein the network based control system comprises a wireless network to establish communication between control units, the data base server, and an interactive interface.

* * * * *